US009216649B2

(12) United States Patent
Beasock et al.

(10) Patent No.: US 9,216,649 B2
(45) Date of Patent: Dec. 22, 2015

(54) POWER TRANSFER MECHANISM FOR 4WD VEHICLES WITH LOW EFFORT MODE SHIFT SYSTEM

(71) Applicant: Magna Powertrain of America, Inc., Troy, MI (US)

(72) Inventors: Randolph E. Beasock, Rochester Hills, MI (US); Thomas E. Bradford, Jr., Brighton, MI (US)

(73) Assignee: Magna Powertrain of America, Inc., Troy, MI (US)

( * ) Notice: Subject to any disclaimer, the term of this patent is extended or adjusted under 35 U.S.C. 154(b) by 0 days.

(21) Appl. No.: 14/279,666

(22) Filed: May 16, 2014

(65) Prior Publication Data

US 2014/0251082 A1  Sep. 11, 2014

Related U.S. Application Data

(63) Continuation-in-part of application No. 13/915,687, filed on Jun. 12, 2013.

(60) Provisional application No. 61/659,040, filed on Jun. 13, 2012, provisional application No. 61/827,335, filed on May 24, 2013.

(51) Int. Cl.
*F16H 37/06* (2006.01)
*B60K 23/08* (2006.01)
*B60K 17/344* (2006.01)

(52) U.S. Cl.
CPC ............ *B60K 23/08* (2013.01); *B60K 17/344* (2013.01); *B60K 2023/0858* (2013.01); *Y10T 74/19074* (2015.01)

(58) Field of Classification Search
USPC ........ 74/665 F, 665 G, 665 GE; 180/233, 247
See application file for complete search history.

(56) References Cited

U.S. PATENT DOCUMENTS

| | | | |
|---|---|---|---|
| 4,721,194 A | 1/1988 | Frost | |
| 4,846,010 A | 7/1989 | Fujikawa et al. | |
| 5,076,112 A | 12/1991 | Williams | |
| 5,443,426 A * | 8/1995 | Frost | 475/91 |
| 5,613,587 A | 3/1997 | Baxter, Jr. | |
| 5,713,243 A | 2/1998 | Williams et al. | |
| 5,992,592 A * | 11/1999 | Showalter | 192/43.1 |
| 6,056,666 A * | 5/2000 | Williams | 475/320 |
| 6,071,207 A | 6/2000 | Stephens et al. | |
| 6,079,535 A | 6/2000 | Mueller et al. | |
| 6,557,680 B2 * | 5/2003 | Williams | 192/27 |
| 6,572,506 B2 * | 6/2003 | Williams et al. | 475/204 |
| 6,579,204 B2 | 6/2003 | Brown et al. | |
| 6,619,153 B2 | 9/2003 | Smith et al. | |
| 6,814,682 B2 | 11/2004 | Spitale | |

(Continued)

*Primary Examiner* — Ha D Ho
(74) *Attorney, Agent, or Firm* — Dickinson Wright PLLC

(57) ABSTRACT

A power transfer mechanism for a four-wheel drive vehicle includes a first shaft for transferring torque to a first driveline, a second shaft for transferring torque to a second driveline, and a transfer mechanism driving the second shaft. A mode clutch drivingly connects the first shaft to the transfer mechanism and includes a clutch gear-driven by the transfer mechanism and a mode sleeve. A sprocket associated with the transfer mechanism has internal spline teeth meshed with external spline teeth on the second shaft with a predetermined amount of backlash therebetween. A ball cam mechanism centers the backlash and permits relative rotation of the transfer mechanism and the mode sleeve to circumvent a blocked mode shift.

20 Claims, 10 Drawing Sheets

(56) References Cited

U.S. PATENT DOCUMENTS

| | | | |
|---|---|---|---|
| 6,974,400 B2 * | 12/2005 | Williams | ................ 475/198 |
| 7,101,304 B2 | 9/2006 | Swanson et al. | |
| 7,229,378 B2 | 6/2007 | Mueller et al. | |
| 7,506,559 B2 | 3/2009 | Swanson et al. | |
| 7,611,414 B2 | 11/2009 | Mueller et al. | |
| 8,267,235 B2 | 9/2012 | Burns et al. | |
| 8,307,731 B2 | 11/2012 | Burns et al. | |
| 2003/0092528 A1 | 5/2003 | Williams | |
| 2012/0178575 A1 | 7/2012 | Mueller et al. | |

* cited by examiner

POWER TRANSFER MECHANISM FOR 4WD VEHICLES WITH LOW EFFORT MODE SHIFT SYSTEM

CROSS REFERENCE TO RELATED APPLICATIONS

This application is a continuation-in-part of U.S. application Ser. No. 13/915,687 filed Jun. 12, 2013 which claims the benefit of U.S. Provisional Application No. 61/659,040 filed Jun. 13, 2012, and further claims the benefit of U.S. Provisional Application No. 61/827,335 filed May 24, 2013.

FIELD

The present disclosure relates generally to power transfer systems equipped with a power transfer device for controlling the distribution of drive torque between the primary and secondary drivelines of a four-wheel drive vehicle. More particularly, the power transfer device is provided with a reduced effort mode shift system for selectively shifting between a two-wheel drive mode and a four-wheel drive mode.

BACKGROUND

This section provides background information related to the present disclosure which is not necessarily prior art.

Based on the popularity of four-wheel drive vehicles, a number of different power transfer systems are presently available for selectively directing power (i.e. drive torque) from a powertrain to all four wheels of the vehicle. Typically, the powertrain transmits drive torque to a first or primary driveline for driving a pair of primary wheels. The power transfer system includes a power transfer device arranged to continuously or selectively transmit a portion of the drive torque to a second or secondary driveline for driving a pair of secondary wheels. In particular, some power transfer devices are equipped with a mode shift mechanism including a mode clutch that can be selectively actuated to shift the motor vehicle between a two-wheel drive mode and a four-wheel drive mode. In the two-wheel drive mode, the mode clutch is released and drive torque is only transmitted via the primary driveline to the primary wheels. In the four-wheel drive mode, the mode clutch is engaged and drive torque is additionally transmitted via the secondary driveline to the secondary wheels.

Many power transfer devices, such as transfer cases and power take-off units (PTU), are equipped with a mode shift mechanism having a sliding sleeve-type mode clutch to facilitate mode shifting when the motor vehicle is moving or at rest. Such sleeve-type mode clutches typically include a clutch hub driven by the primary driveline, a clutch gear drivingly connected to the secondary driveline, and a mode sleeve coupled for rotation with the clutch hub and which is slidably moveable thereon between first and second mode positions. In the first mode position, the mode sleeve is disengaged from coupled engagement with the clutch gear so as to establish the two-wheel drive mode. In the second mode position, the mode sleeve drivingly couples the clutch gear to the clutch hub so as to establish the four-wheel drive mode. The mode clutch may also include a synchronizer assembly that is operably disposed between the mode sleeve and the clutch gear to facilitate speed synchronization between the clutch hub and the ditch gear prior to complete movement of the mode sleeve into its second mode position.

The mode shift mechanism may further include a power-operated shift actuator for selectively moving the mode sleeve between its first and second mode positions. Such a power-operated shift actuator may include an electric motor driving a rotary-to-linear conversion device which, in turn, is configured to axially translate a shift fork for slidably translating the mode sleeve. A manually-operated mode select device (i.e., lever, push-button, toggle switch, etc.) located in the passenger compartment of the vehicle may be engaged to select between the two-wheel drive mode and the four-wheel drive mode. Upon selection of the desired drive mode, a mode signal is transmitted to a controller for controlling actuation of the electric motor to cause axial translation of the mode sleeve toward the mode position corresponding to the selected drive mode.

However, during an attempted mode shift from the two-wheel drive mode into the four-wheel drive mode, a "blocked" condition may occur between the engagement teeth on the mode sleeve and the clutch teeth on the clutch gear. Typically, a blocked condition exists when the engagement teeth on the mode sleeve are aligned with the clutch teeth on the clutch gear so as to prevent the mode sleeve from moving completely into its second mode position. When such a blocked condition exists, further axial translation of the mode sleeve toward its second mode position may only occur if the clutch gear is rotatably indexed relative to the mode sleeve to eliminate the blocked tooth condition. Accordingly, a significant axial force must be applied through the mode sleeve to the clutch gear to exert an index torque that is adequate to rotatably index the clutch gear relative to the mode sleeve.

Despite the shortcoming noted above, many conventional power transfer devices are equipped with a power-operated mode shift actuator that is only capable of outputting an axial force (generated via the electric motor and the rotary-to-linear conversion device) to the mode sleeve having a magnitude sufficient to complete the 2WD/4WD mode shift during an "unblocked" condition. To overcome blocked conditions, some conventional mode shift mechanisms may incorporate a spring-biasing arrangement configured to normally bias the mode sleeve toward its second mode position and assist in completing the 2WD/4WD mode shift once the tooth block condition has been eliminated due to rolling movement of the vehicle. To address this shortcoming, it has been proposed to increase the magnitude of the axial force transmitted by the power-operated mode shift actuator to the mode sleeve. Unfortunately, such a solution would be undesirably costly and require large mode shift components and high power actuators. Accordingly, a recognized need exists in the industry to provide a reduced effort mode shift mechanism that permits use of smaller and less expensive components and low power actuators while providing an axial force sufficient to overcome most tooth block conditions.

SUMMARY

This section provides a general summary of the disclosure and is not a comprehensive disclosure of its full scope or all of its features.

It is an aspect of the present disclosure to provide a mode shift mechanism for use in shifting a power transfer device between a two-wheel drive mode and a four-wheel drive mode and which employs a low effort shift operator in conjunction with a sleeve-type mode clutch assembly. The power transfer device is configured to normally transmit drive torque from a powertrain to a primary driveline and to selectively transmit drive torque to a secondary driveline through engagement of the mode clutch assembly.

It is another aspect of the present disclosure to configure and locate the low effort shift operator for reducing the tangential load required to rotatably index a clutch gear relative to a mode sleeve of the mode clutch assembly. The low effort shift operator may be operably disposed between the clutch gear and a component of a transfer mechanism which is drivingly connected to the secondary driveline.

It is a further aspect of the present disclosure to intentionally introduce a predetermined amount of angular play or "backlash" into the mode shift mechanism by providing an additional interface between the clutch gear and the component of the transfer mechanism which is drivingly connected to the secondary driveline.

In accordance with one or more of these aspects, the additional interface can be operably disposed between the clutch gear and a component of the transfer mechanism that is mounted on a first output shaft. The additional interface is configured as a low effort shift operator which may include a spring-loaded cam mechanism that is disposed between the clutch gear and the component of the transfer mechanism. The additional interface noted above can be operably disposed between the clutch gear and a transfer hub that is rotatably mounted on the first output shaft. A first transfer component, such as a first sprocket, is coupled for rotation with the transfer hub and is operable for driving a second transfer component, such as a second sprocket, which is drivingly connected to a second output shaft.

In accordance with these and other aspects, the additional interface can optionally be operably disposed between the second sprocket and the second output shaft and may include a spring-loaded cam mechanism disposed therebetween. Specifically, the spring-loaded cam mechanism may include spring-loaded balls retained in pockets formed in one of the second sprocket and the second output shaft and centering ramp seats formed in the other of the second sprocket and the second output shaft. The cam mechanism may extend either parallel or transversely relative to a rotary axis of the second sprocket and the second output shaft.

Based on these aspects, the present disclosure provides a power transfer device for a four-wheel drive vehicle which includes a first output shaft for normally transferring torque to a first driveline and a second output shaft for selectively transferring torque to a second driveline. A mode clutch assembly is operable for drivingly connecting the first and second output shafts and may include a clutch hub driven by the first output shaft, a clutch gear, a mode sleeve driven by and axially moveable on the clutch hub relative to the clutch gear, and a low effort shift operator. A transfer mechanism is driven by the second output shaft and includes a transfer component rotatably surrounding the first output shaft. A transfer hub is fixedly connected to the transfer component. The low effort shift operator is disposed between the transfer hub and the clutch gear to permit angular relative movement therebetween during axial movement of the mode sleeve into coupled engagement with the clutch gear. The transfer hub includes external drive teeth that are interdigitated with internal drive teeth formed on the clutch gear and which define a predetermined amount of clearance therebetween. The low effort shift operator includes a cam mechanism that is configured to normally center the interdigitated internal and external drive teeth and facilitate take-up of the clearances therebetween via controlled relative rotation between the clutch gear and the transfer hub which is required to permit complete engagement of mode sleeve with the clutch gear so as to circumvent blocked mode shifts.

A power transfer device for a four-wheel drive vehicle having a first driveline for driving a pair of first wheels and a second driveline for driving a pair of second wheels may include a low effort shift operator configured to facilitate smooth shifting of a mode shift clutch assembly. The power transfer device includes a first shaft driving the first driveline, a second shaft driving the second driveline, and a transfer mechanism drivingly coupled to the second shaft and selectively engageable by the mode clutch assembly to cause the first shaft to drive the second shaft and establish a four-wheel drive mode. The low shift effort operator is associated with an interface connection between the mode clutch and the transfer mechanism and is configured to provide a predefined amount of backlash into the interface to facilitate smooth engagement of the mode shift clutch assembly. The low shift effort operator includes a toothed connection and a spring-biased cam mechanism to maintain the toothed connection in a "centered" orientation. Actuation of the spring-biased cam mechanism permits introduction of the backlash into the toothed connection to circumvent a blocked mode shift when a mode sleeve driven by the first shaft moves into engagement with a clutch gear. The low effort shift operator interconnects the clutch gear to the transfer mechanism.

Another version of a power transfer mechanism for a four-wheel drive vehicle having a first driveline for driving a pair of first wheels and a second driveline for driving a pair of second wheels may include a low effort shift operator to facilitate smooth shifting of a mode shift clutch assembly. The power transfer mechanism includes a first shaft driving the first driveline, a second shaft driving the second driveline, and a transfer assembly drivingly coupled to the second shaft and selectively engageable by the mode clutch assembly to cause the first shaft to drive the second shaft and establish a four-wheel drive mode. The low effort shift operator is associated with an interface connection between the second shaft and the transfer assembly and is configured to provide a predefined amount of backlash into the interface to facilitate smooth engagement of the mode shift clutch assembly. The low effort shift operator includes a loose spline connection and a spring-biased cam mechanism to maintain a "centered" spline connection. Actuation of the spring-biased cam mechanism permits introduction of the blacklash into the spline connection to circumvent a blocked mode shift when a mode sleeve driven by the first shaft moves into engagement with a clutch gear driven by the transfer assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

In general, the present disclosure is directed to incorporation of a low effort shift operator into a mode shift system associated with a power transfer device of the type adapted to be installed in a four-wheel drive or all-wheel drive motor vehicle. The low effort shift operator is operable to introduce a predetermined amount of angular clearance, hereinafter referred to as "backlash", at a preselected component interface within the mode shift system. The low effort shift operator is capable of reducing the tangential load required to index a component of a transfer mechanism relative to an axially moveable mode sleeve associated with a mode clutch assembly so as to inhibit blocked mode shifts. The location, structure and function of the low effort shift operator will now be described in association with an exemplary mode shift system integrated into an exemplary power transfer device of the type used in four-wheel drive vehicles, with particular attention drawn to the following written description in combination with the accompanying drawings.

Figure 1:
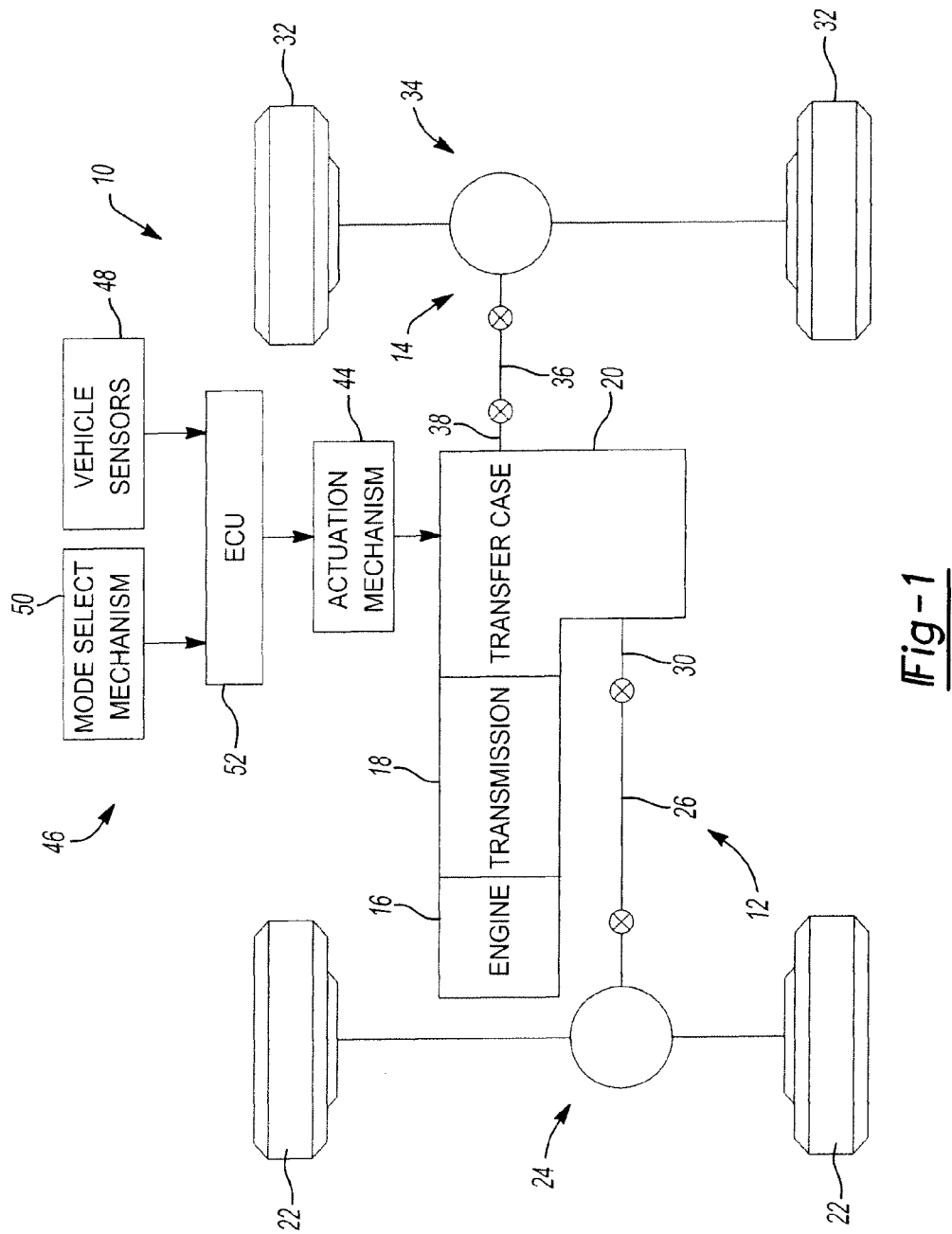
FIG. 1 is a schematic depicting a four-wheel drive motor vehicle equipped with a power transfer device constructed and operable in accordance with the teachings of the present disclosure.

Referring now to FIG. 1 of the drawings, an exemplary four-wheel drive vehicle 10 is schematically shown to include a front driveline 12, a rear driveline 14 and a powertrain for generating and selectively delivering rotary tractive power (i.e., drive torque) to the drivelines. The powertrain is shown to include an engine 16 and a transmission 18 which may be of either the manual or automatic type. In the particular embodiment shown, vehicle 10 further includes a power transfer device 20 for transmitting drive torque from the powertrain to front driveline 12 and rear driveline 14. In the particular vehicular arrangement shown, power transfer device 20 is configured as a "transfer case". Front driveline 12 includes a pair of front wheels 22 connected via a front axle assembly 24 and a front propshaft 26 to a front output shaft 30 of transfer case 20. Similarly, rear driveline 14 includes a pair of rear wheels 32 connected via a rear axle assembly 34 and a rear propshaft 36 to a rear output shaft 38 of transfer case 20.

Figure 2:
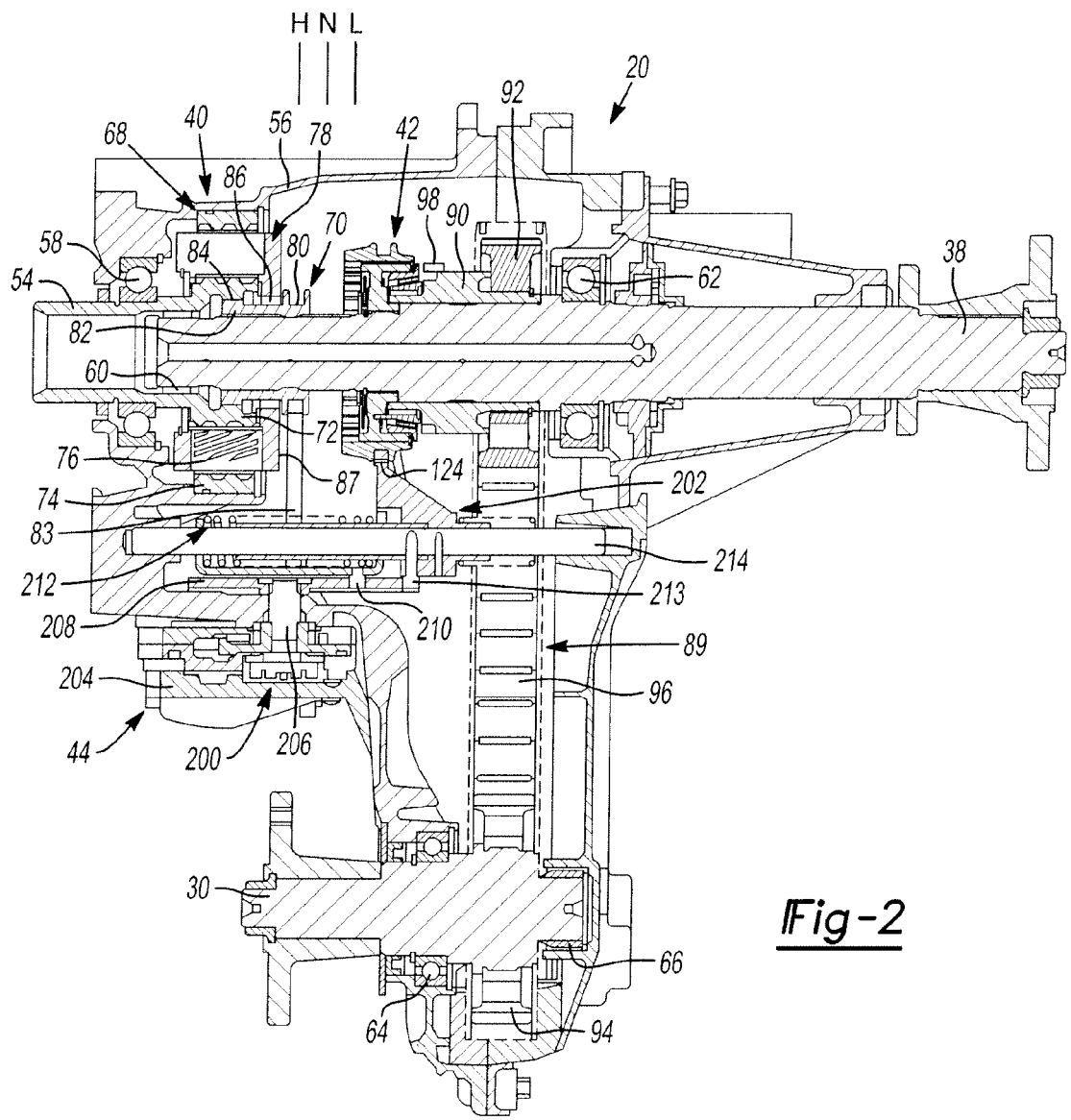
FIG. 2 is a sectional view taken through an exemplary power transfer device having a mode shift mechanism configured to include a low effort shift operator and a mode clutch assembly that are constructed and operable in accordance with the teachings of the present disclosure.
Figure 3:
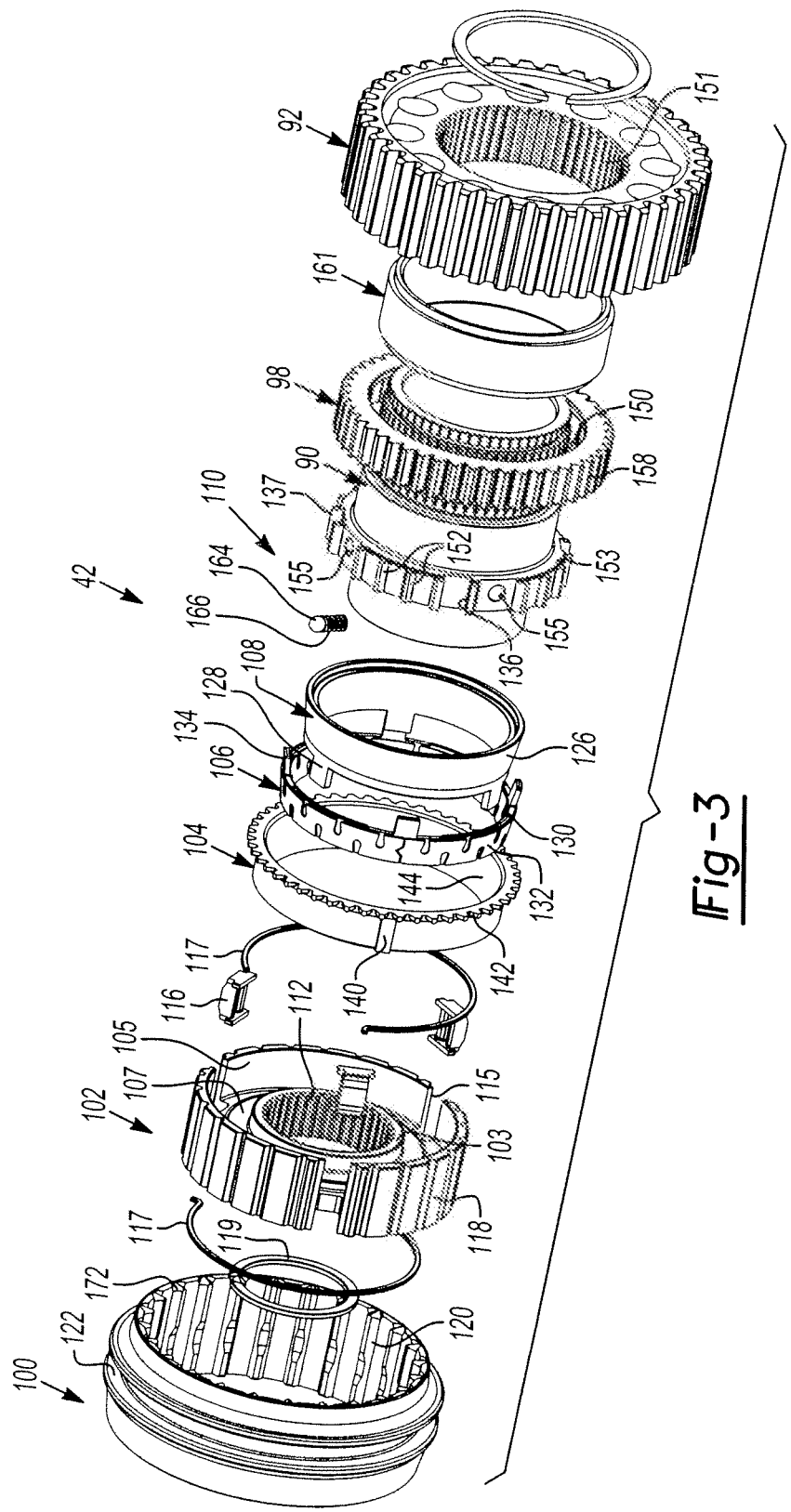
FIG. 3 is an exploded perspective view of the mode clutch assembly and the low effort shift operator associated with the mode shift mechanism of the power transfer device shown in FIG. 2.
Figure 4:
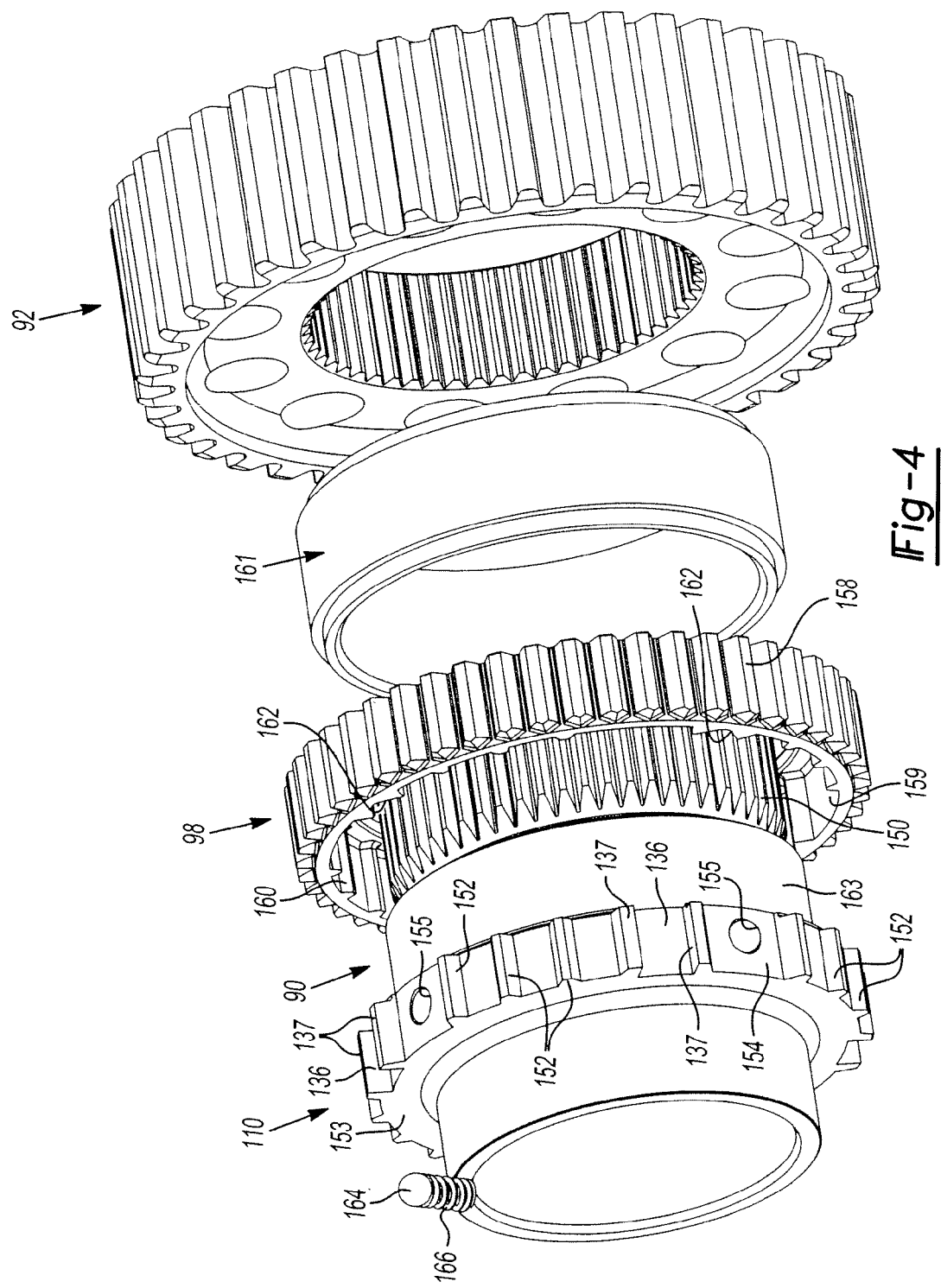
FIG. 4 is an exploded perspective view showing various components of low effort shift operator associated with the mode shift mechanism and the power transfer device of the present disclosure.

Referring primarily to FIGS. 1 and 2, transfer case 20 is shown to be generally equipped with a two-speed range unit 40, a mode clutch assembly 42, and a power-operated shift actuator 44 that is operable to control coordinated actuation of range unit 40 and mode clutch assembly 42. In addition, a control system 46 is provided for controlling actuation of shift actuator 44. Control system 46 may include one or more vehicle sensors 48 for detecting real time operational characteristics of motor vehicle 10, a mode select mechanism 50 for permitting the vehicle operator to select one of the available drive modes, and an electronic control unit (ECU) 52 that is operable to generate electric control signals in response to sensor signals from sensors 48 and mode signals from mode, select mechanism 50.

In accordance with the exemplary drivetrain arrangement shown for vehicle 10, rear output shaft 38 and rear driveline 14 cumulatively define a first or primary driveline that is adapted to normally receive drive torque from the powertrain. Likewise, front output shaft 30 and front driveline 12 cumulatively define a second or secondary driveline that is adapted to only receive drive torque from the powertrain upon engagement of mode clutch assembly 42. Those skilled in the art will recognize and appreciate that the drivetrain arrangement for vehicle 10 could be alternatively arranged with front driveline 12 as the primary driveline and rear driveline 14 as the secondary driveline when power transfer device 20 is configured as a "power take-off unit" and the powertrain is oriented transversely to the longitudinal direction of the vehicle.

Transfer case 20 includes an input shaft 54 that is adapted for driven connection to the output shaft of transmission 18. Input shaft 54 is supported in a housing 56 by a bearing assembly 58 for rotation about a first rotary axis. Rear output shaft 38 is supported between input shaft 54 and housing 56 for rotation about the first rotary axis via a pair of laterally-spaced bearing assemblies 60 and 62. In addition, front output shaft 30 is supported in housing 56 for rotation about a second rotary axis via a pair of bearing assemblies 64 and 66.

Range unit 40 is shown to generally include a planetary gearset 68 and a range clutch 70. Planetary gearset 68 may include a sun gear 72 driven by input shaft 54, a ring gear 74 non-rotatably fixed to housing 56, and a plurality of planet gears 76 rotatably supported from a planet carrier 78. As seen, planet gears 76 are meshed with both sun gear 72 and ring gear 74. Planetary gearset 68 functions to drive planet carrier 78 at a reduced speed relative to input shaft 54. Range clutch 70 includes a range collar 80 that is coupled via a splined connection for rotation with and axial sliding movement on a portion of rear output shaft 38. Range collar 80 has external clutch teeth 82 adapted to selectively engage either internal clutch teeth 84 formed on input shaft 54 or internal clutch teeth 86 formed on a carrier ring 87 associated with planet carrier 78. Range collar 80 is shown located in a first or high (H) range position such that its clutch teeth 82 are engaged with clutch teeth 84 on input shaft 54. As such, a direct speed ratio or "high-range" drive connection is established between input shaft 54 and rear output shaft 38. Range collar 80 is axially moveable on rear output shaft 38 from its H range position through a second or neutral (N) position into a third or low (L) range position. Location of range collar 80 in its N position functions to disengage its clutch teeth 82 from both clutch teeth 84 on input shift 54 and clutch teeth 86 on carrier ring 87, thereby uncoupling rear output shaft 38 from driven connection with input shaft 54. In contrast, movement of range collar 80 into its L range position causes its clutch teeth 82 to engage clutch teeth 86 on carrier ring 87 of planet carrier 78, thereby establishing a reduced speed ratio or "low-range" drive connection between input shaft 54 and rear output shaft 38. Range collar 80 includes an annular groove 81 adapted to receive a range fork 83 associated with power-operated shift actuator 44.

It will be appreciated that planetary gearset 68 and non-synchronized range clutch 70 function to provide transfer case 20 with a two-speed (i.e., high-range and low-range) feature. However, the non-synchronized range clutch 70 disclosed could be easily replaced with a synchronized range clutch to permit "on-the-move" range shifting between the high-range and low-range drive modes without the need to stop the motor vehicle. Furthermore, any two-speed reduction unit having a shift member axially moveable to establish first and second speed ratio drive connections between input shaft 54 and rear output shaft 38 is also considered to be within the scope of this invention. In addition, the teachings of the present disclosure are also applicable to single speed versions of transfer cases 20 wherein rear output shaft 38 is directly coupled to or formed integrally with input shaft 54.

Mode clutch assembly 42 is operable to selectively transfer drive torque from rear output shaft 38 through a transfer mechanism 89 to front output shaft 30. Transfer mechanism 89 may include a transfer hub, hereinafter referred to as a sprocket hub 90, that is supported for rotation on rear output shaft 38. Sprocket hub 90 is fixed via a splined connection for rotation with a first transfer component, hereinafter referred to as drive sprocket 92. A second transfer component, hereinafter referred to as driven sprocket 94, is fixed via a splined connection for rotation with front output shaft 30. A flexible power transmission member, such as a power chain 96, encircles and drivingly interconnects first sprocket 92 and second sprocket 94. Transfer mechanism 89 may alternatively be configured as a geared arrangement at least including a drive gear rotatably supported on rear output shaft 38 and a driven gear fixed to front output shaft 30. In such an alternative geared transfer arrangement, a transfer hub would be fixed for rotation with the drive gear.

Referring now primarily to FIGS. 3 through 9, mode clutch assembly 42 is shown to generally include a clutch gear 98, a mode collar or sleeve 100, a clutch hub 102, a blocker ring 104, a middle cone 106, an inner cone 108, and a low effort shift operator 110. Clutch hub 102 has an inner cylindrical hub segment 103 formed with internal splines 112 that are in driving engagement with external splines 114 formed on rear output shaft 38. Clutch hub 102 also includes an outer cylindrical hub segment 105 formed with a plurality of circumferentially spaced apart slots 115 each in receipt of a strut 116. Retaining rings 117 maintain a desired axial position of struts 116 relative to a radial web segment 107 of clutch hub 102. Web segment 107 interconnects inner hub segment 103 to outer hub segment 105 of clutch hub 102. A plurality of slots 109 formed in web segment 107 are aligned with the plurality of slots 115 formed in outer hub segment 105. A plurality of elongated longitudinally-extending external lugs or hub teeth 118 are circumferentially spaced apart and formed on an outer peripheral surface of outer hub segment 105 of clutch hub 102. A snap ring 119 axially locates and retains clutch hub 102 relative to rear output shaft 38.

Mode sleeve 100 includes a plurality of elongated longitudinally-extending internal lugs or engagement teeth 120 that are in sliding meshed engagement with external hub teeth 118. As such, mode sleeve 100 is driven by rear output shaft 38. An annular groove 122 is formed on mode sleeve 100 for receipt of a portion of a mode fork 124 associated with power-operated shift actuator 44.

Blocker ring 104, middle cone 106 and inner cone 108 cumulatively define a synchronizer assembly that is operable for facilitating speed synchronization between clutch hub 102 and clutch gear 98. Inner cone 108 includes an outer conical friction surface 126 and a plurality of axially extending tabs 128 which extend into slots 109 in web segment 107 so as to couple inner cone 108 for rotation with clutch hub 102. Middle cone 106 includes an inner conical friction surface 130 configured for driving engagement with outer conical surface 126 on inner core 108 and also includes an outer conical friction surface 132. A plurality of circumferentially spaced apart and axially extending tabs 134 cooperate with slots 136 formed on sprocket hub 90 so as to fix middle cone 106 for rotation with sprocket hub 90. Slots 136 are each shown to be formed between a pair of raised lugs 137 which extend outwardly from a raised ring segment 153 of sprocket hub 90. Blocker ring 104 includes a plurality of radially extending tabs 140 which cooperate with struts 116 and slots 115 to allow blocker ring 104 to rotate or circumferentially index only a predetermined amount relative to clutch hub 102. A plurality of external blocker teeth 142 are formed on blocker ring 104 and are configured to selectively drivingly mesh with internal engagement teeth 120 of mode sleeve 100. An inner conical friction surface 144 formed on blocker ring 104 is configured for selective driving engagement with outer conical surface 132 on middle cone 106.

Sprocket hub 90 includes a tubular end segment 146 having external spline teeth 150 that are drivingly engaged with internal spline teeth 151 formed on first sprocket 92. As such, sprocket hub 90 is coupled to be driven by the secondary driveline via transfer mechanism 89. Low effort shift operator 110 is operably associated with sprocket hub 90 and clutch gear 98 and includes a plurality of circumferentially spaced apart lugs or external drive teeth 152 which extend radially outwardly from raised ring segment 153 of sprocket hub 90. A plurality of recesses 154 are provided on raised ring segment 153 of sprocket hub 90 between raised lugs 137 and external drive teeth 152. Recesses 154 are equally spaced with an exemplary quantity of four (4) shown in the drawings. A radial bore or retention pocket 155 is formed within each recess 154.

Clutch gear 98 includes a set of elongated and longitudinally-extending external clutch teeth 158 that are sized and shaped for selective driving engagement with engagement teeth 120 of mode sleeve 100. As part of low effort shift operator 110, clutch gear 98 also includes a set of lugs or internal drive teeth 160 that are sized and shaped to mate with external drive teeth 152 on ring segment 153 of sprocket hub 90 with a predetermined amount of "backlash" therebetween that is greater than provided in typical splined or drive gear engagements. In the example depicted in the drawings, an overall amount of backlash of about eight degrees of relative rotation is provided between clutch gear 98 and sprocket hub 90 via the interdigitated meshing of external drive teeth 152 with internal drive teeth 160. In addition, a plurality of recesses 159 are formed in clutch gear 98 between its internal drive teeth 160 and which are configured to receive raised lugs 137 of sprocket hub 90. A spacer sleeve 161 is also provided to axially and radially locate and constrain clutch gear 98 relative to sprocket hub 90. Spacer sleeve 161 generally surrounds an intermediate segment 163 of sprocket hub 90 that is located between end segment 146 and raised ring segment 153. Sleeve 161 may be connected to first sprocket 92, but must be configured to permit limited relative rotation between clutch gear 98 and sprocket hub 90 corresponding to the predetermined amount of backlash provided therebetween by low effort shift operator 110.

Figure 7:
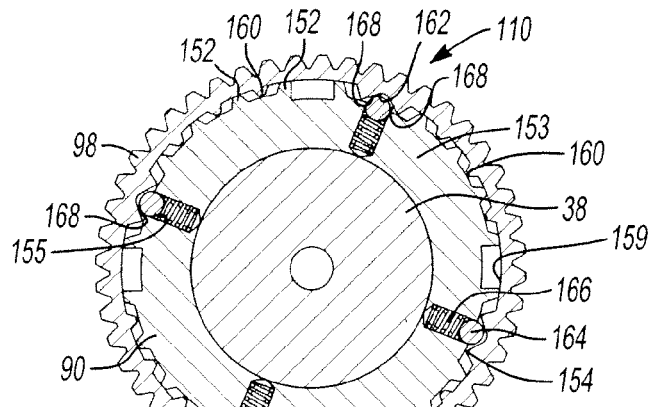
FIG. 7 is a sectional view taken generally along line 7-7 as shown in FIG. 5.
Figure 8:
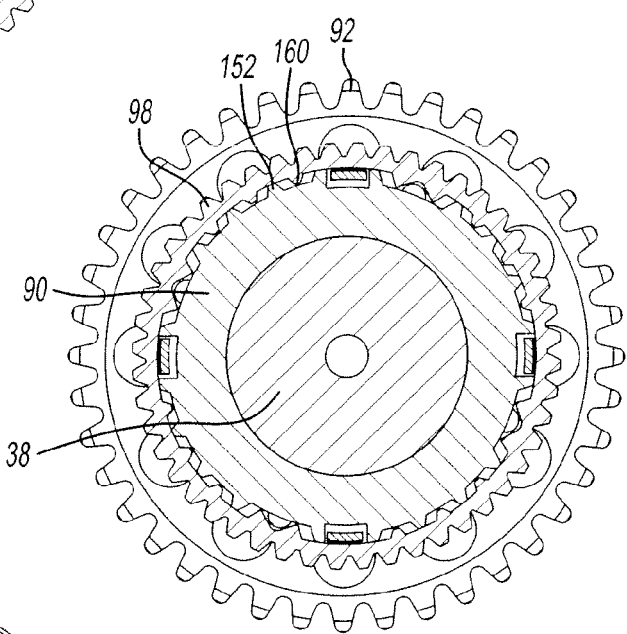
FIG. 8 is a sectional view taken generally along line 8-8 as shown in FIG. 5.
Figure 9:
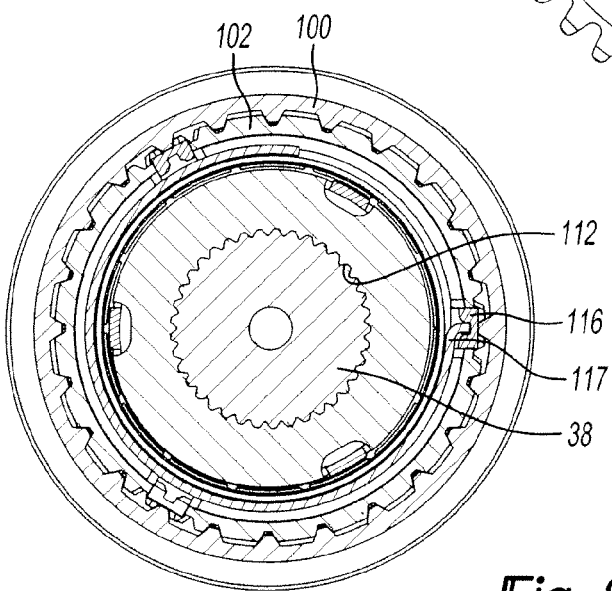
FIG. 9 is a sectional view taken generally along line 9-9 as shown in FIG. 5.

Low shift effort operator 110 also includes a spring-biased cam mechanism that is operably disposed between sprocket hub 90 and clutch gear 98. The spring-biased cam mechanism includes a plurality of "ramped" seats, hereinafter referenced to as ball seats 162, that are circumferentially spaced apart from one another and formed on clutch gear 98 between pairs of internal drive teeth 160. Ball seats 162 are adapted to be aligned, upon assembly, with recesses 154 formed in ring segment 153 of sprocket hub 90. The spring-biased cam mechanism further includes a plurality of followers, such as balls 164, which are biased into engagement with each ball seat 162 by biasing members, such as coil springs 166. Springs 166 and balls 164 are at least partially positioned within radial retention pockets 155. As best shown in FIG. 7, each internal drive tooth 160 formed in clutch gear 98 is centrally disposed between adjacent external drive teeth 152 formed on sprocket hub 90 when balls 164 are centered within the deepest portion of ball seats 162. Ball seats 162 are configured to be symmetrical and define a pair of ramp surfaces 168. When a relative (i.e. indexing) torque is applied between sprocket hub 90 and clutch gear 98 in either direction, one of the pair of ramp surfaces 168 associated with each ball seat 162 acts to forcibly urge balls 164 to move radially inwardly in opposition to the biasing of springs 166. This camming action allows a limited range of relative rotation between clutch gear 98 and sprocket hub 90. The relative rotation is limited, however, by a positive driving engagement that is established when internal drive teeth 160 on clutch gear 98 physically engage external drive teeth 152 on raised ring segment 153 of sprocket hub 90. In the example depicted in the drawings, such a positive or direct tooth engagement occurs after about four degrees of relative rotation in either direction.

Figure 5:
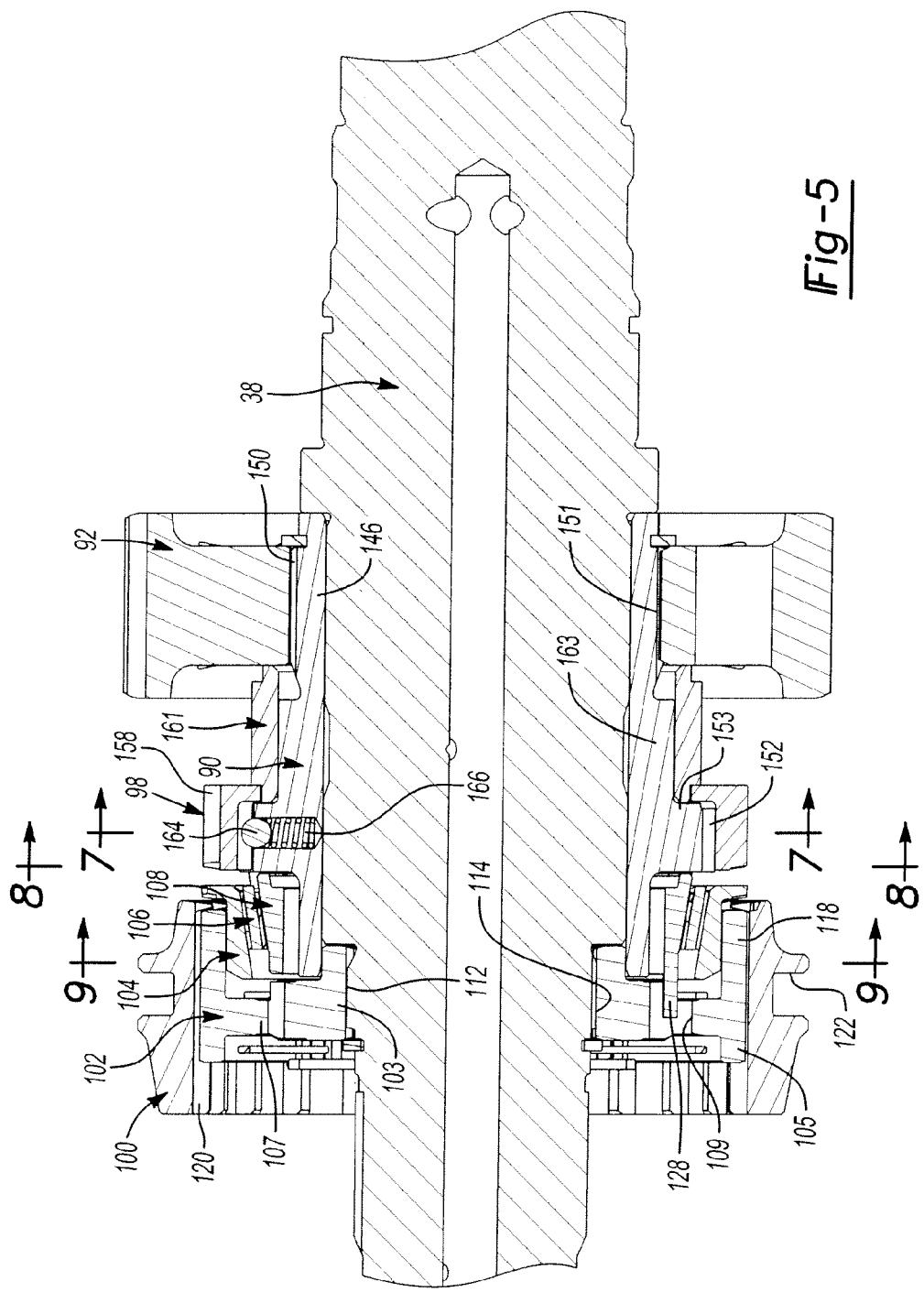
FIG. 5 is a fragmentary sectional view of a portion of the power transfer device showing components of the low effort shift operator and the mode clutch assembly.
Figure 6:
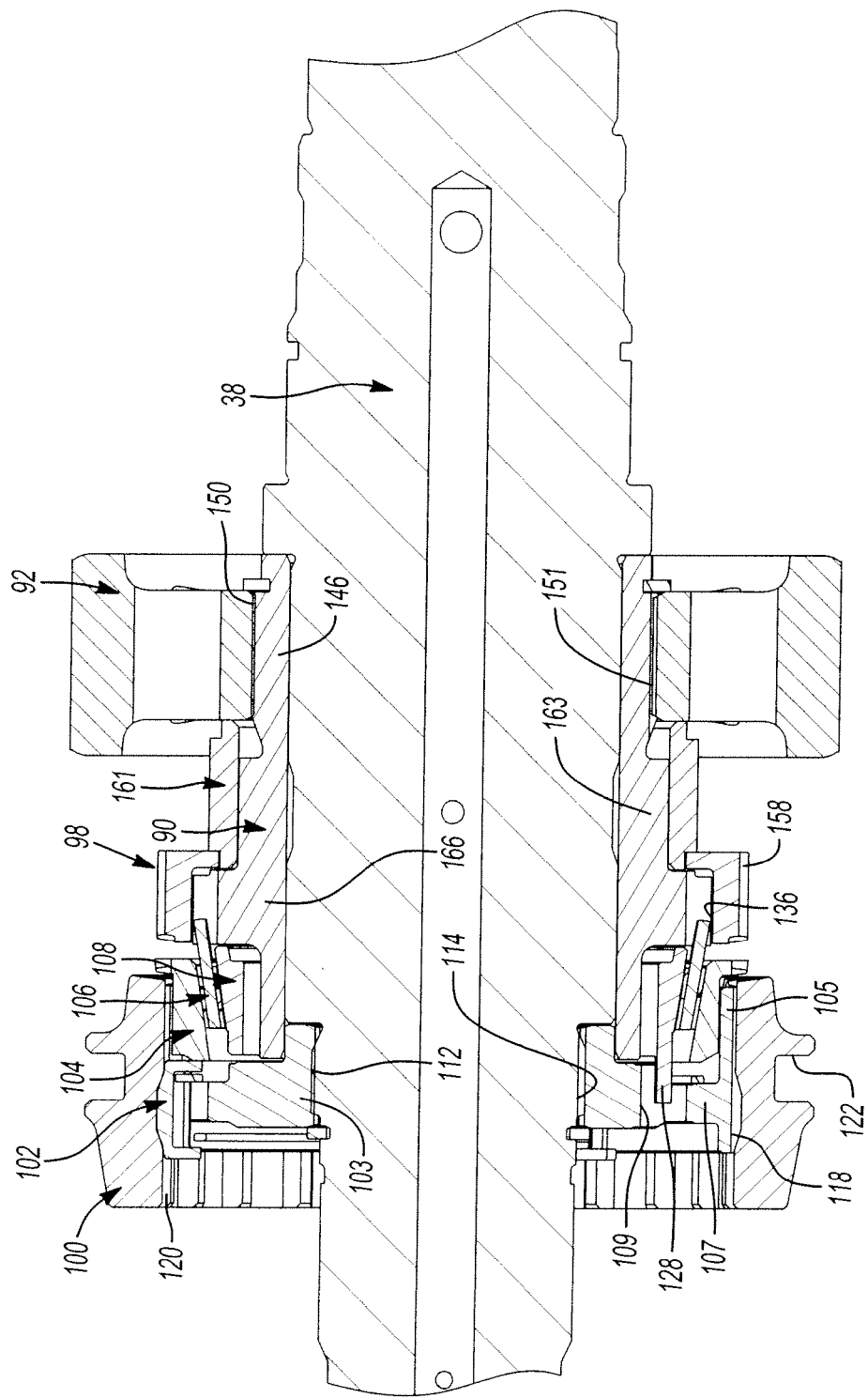
FIG. 6 is a sectional view taken generally along a different plane than the plane associated with the sectional view of FIG. 5.

Mode sleeve 100 is shown in FIGS. 2, 5 and 6 in a first or two-wheel drive mode position so as to place mode clutch assembly 42 in a disengaged condition for operating transfer case 20 in a 2WD mode. Specifically, with mode sleeve 100 in its two-wheel drive mode position, its engagement teeth 120 are displaced from engagement with clutch teeth 158 on clutch gear 98. As such, first sprocket 92 is not drivingly coupled to rear output shaft 38 such that drive torque is not transmitted through transfer mechanism 89 to front output shaft 30. In contrast, when mode sleeve 100 is axially moved on clutch hub 102 into a second or four-wheel drive mode position, mode clutch assembly 42 is placed in an engaged condition for operating transfer case 20 in a 4WD mode. Specifically, with mode sleeve 100 in its four-wheel drive mode position, its engagement teeth 120 are drivingly engaged with clutch teeth 158 on clutch gear 98. As such, drive torque is transmitted from rear output shaft 38 to drive sprocket 92 through clutch hub 102, mode sleeve 100, clutch gear 98 and sprocket hub 90.

As noted, power-operated shift actuator 44 is provided for controlling movement of range collar 80 between its three distinct range positions and mode sleeve 100 between its two distinct mode positions. Shift actuator 44 includes a power-operated actuation device 200 and a rotary-to-linear conversion mechanism 202. Actuation device 200 may include an electric motor 204 having a motor output 206 that can be rotated in either direction based on control signals sent to electric motor 204 from controller 52. Motor output 206 may be connected to a sector plate 208 associated with conversion mechanism 202. Sector plate 208 may include a range cam surface and a mode cam surface. A range follower 210, fixed to a range shift assembly 212, rides along the range cam surface of sector plate 208 to convert rotation of motor output 206 into translational movement of range fork 83. Likewise, a mode follower 213, fixed to mode fork 124, rides along the mode cam surface of sector plate 208 to convert rotation of motor output 206 in translational movement of mode fork 124. The profiles of the range cam surface and the mode cam surface are configured to coordinate translational movement of range collar 80 and mode sleeve 100 in response to rotation of sector plate 208 for establishing the specific drive mode selected via mode select mechanism 50. These drive modes may include a two-wheel high-range drive mode, a neutral (i.e. towing) mode, a four-wheel high-range drive mode and a four-wheel low-range drivel mode. A rail 214 is shown installed within transfer case 20 for supporting range shift assembly 212 and a tubular section 216 of mode fork 124 for movement thereon. In single-speed versions of power transfer units 20, range shift assembly 212, range clutch 70 and planetary gearset 68 are eliminated. It will be understood that any power-operated (or manually-operable) shift actuator 44 can be used to generate and apply an axially-directed bi-directional shift force to mode sleeve 100.

During operation, if an attempted mode shift from the two-wheel drive mode of operation into the four-wheel drive mode of operation is blocked, engagement teeth 120 on mode sleeve 100 will typically impact clutch teeth 158 of clutch gear 98 after passing through blocker teeth 142 on blocker ring 104. Each engagement tooth 120 on mode sleeve 100 includes a pointed end having opposing guide faces 172 formed thereon. During such an attempted mode shift, an axial load is applied to mode sleeve 100 via mode fork 124 which is generated by shift actuator 44. Mode sleeve 100 translates relative to clutch hub 102 and blocker ring 104 as blocker teeth 142 mesh with teeth 120. At this time, as previously described, full engagement of sleeve teeth 120 with clutch teeth 158 of clutch gear 98 is blocked due to a relative rotational misalignment of the teeth so as to prevent mode sleeve 100 from moving completely into its four-wheel drive mode position. In the past, a relatively large axial force would need to be applied to the mode sleeve 100 to rotate a clutch gear that is directly coupled to or integral with a drive sprocket and its associated driveline components to permit completion of the mode shift. It should be appreciated that this force may be relatively large due to the number of driveline components fixed for rotation with prior versions of the clutch gear. The present arrangement alleviates the need for such a high magnitude application force being applied to mode sleeve 100 through introduction of the intentional backlash made available between internal drive teeth 160 on clutch gear 98 and external drive teeth 152 on sprocket hub 90 provided by the additional interface associated with low effort shift operator 110.

More specifically, as an axial load is applied to mode sleeve 100, guide faces 172 engage front edges of clutch teeth 158 on clutch gear 98. The tangential load or torque required to rotate clutch gear 98 may be calculated based on the angle of guide faces 172, the angle of ramp surfaces 168 and the biasing load applied by springs 166. By design, the torque required to rotate clutch gear 98 and the associated axial force required from mode fork 124 is substantially less than the torque and forces required to rotate driveline components of the prior designs. As such, low efforts shift operator 110 permits clutch gear 98 to rotate relative to mode sleeve 100 and sprocket hub 90 until its clutch teeth 158 are properly align with sleeve teeth 120, thereby allowing mode sleeve 100 to fully translate to its second or four-wheel drive mode position. Once the mode shift has been completed, drive torque is transferred from rear output shaft 38 to first sprocket 92 through clutch hub 102, mode sleeve 100, sleeve teeth 120, clutch gear teeth 158, drive teeth 160 on clutch gear 98 and drive teeth 152 on sprocket hub 90. In this way, low effort shift operator 110 provides an additional interface between mode sleeve 100 and clutch gear 98 for introducing limited and controlled backlash therebetween to facilitate smoother mode shifts with reduced axial and tangential load requirements.

The construction and functions described above for transfer case 20 was directed to introducing limited backlash between mode sleeve 100 and first sprocket 92 of transfer mechanism 89. Those skilled in the art will recognize that this inventive feature of providing an additional interface between two relatively rotatable components for inhibiting blocked mode shifts is applicable to other locations within the torque transferring components of transfer case 20. Specifically, referring now to FIG. 10, a transfer case 20A that is generally similar to transfer case 20 of FIG. 2 is shown. Generally speaking, transfer case 20A differs from transfer case 20 in that the low effort shift operator 110 has been removed from its location between mode sleeve 100 and clutch gear 98 and is relocated to now introduce backlash between second sprocket 94A and front output shaft 30A. Specifically, a low effort shift or gear operator, hereinafter referred to as LEGO 110A, is now shown to be located between the driving interconnection of second sprocket 94A and first output shaft 30A. As such, transfer case 20A would be equipped with an otherwise conventional mode clutch assembly 42A that would include an axially moveable mode sleeve 100A and a clutch gear 98A having no supplemental backlash introduced therebetween. In such an arrangement, clutch gear 98A would be fixed to, or integrally formed with, sprocket hub 90A.

Figure 10:
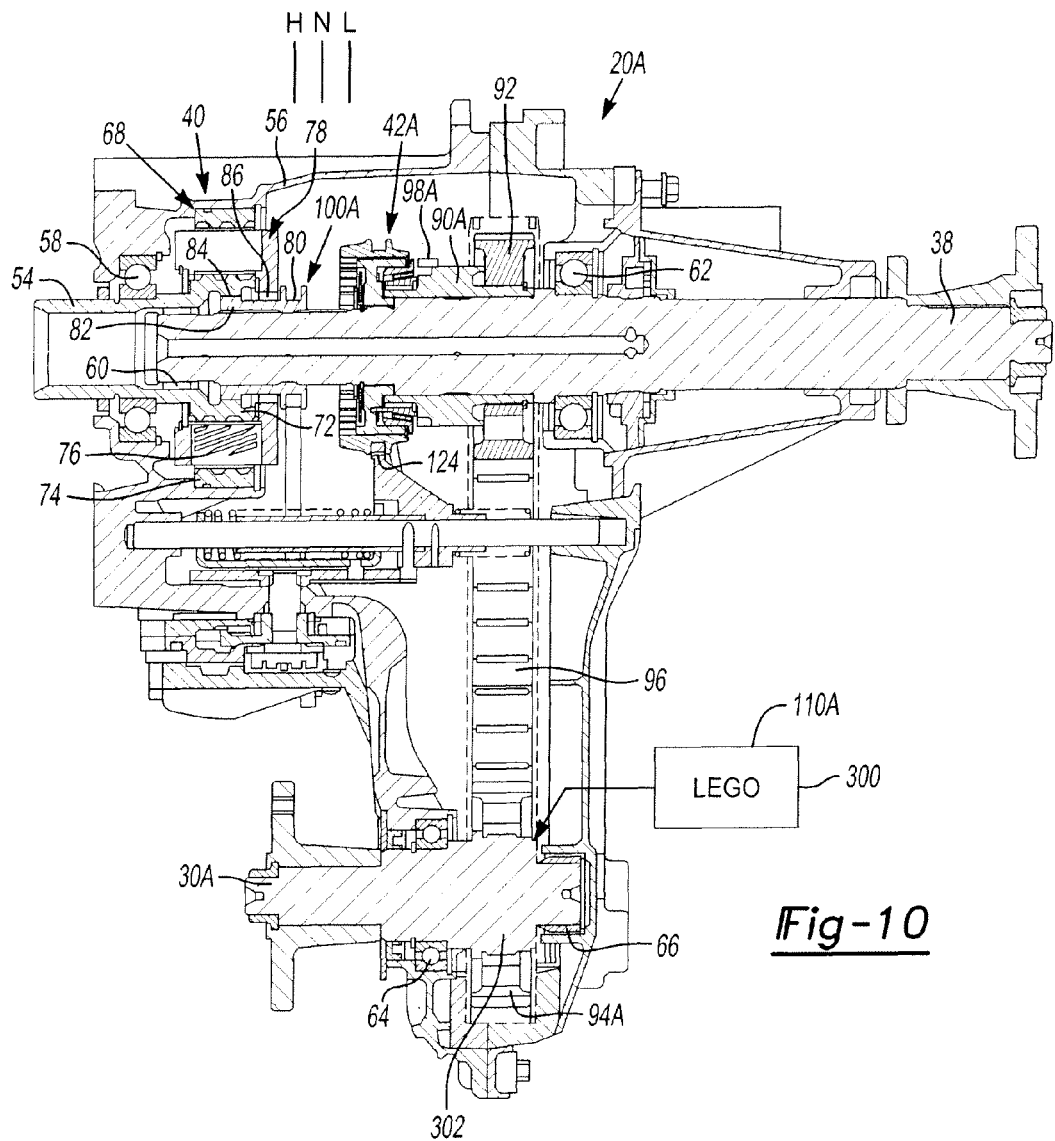
FIG. 10 is a sectional view of an exemplary power transfer device, similar to that shown in FIG. 2, except now equipped with a low effort shift operator located remotely from the mode shift system.
Figure 11:
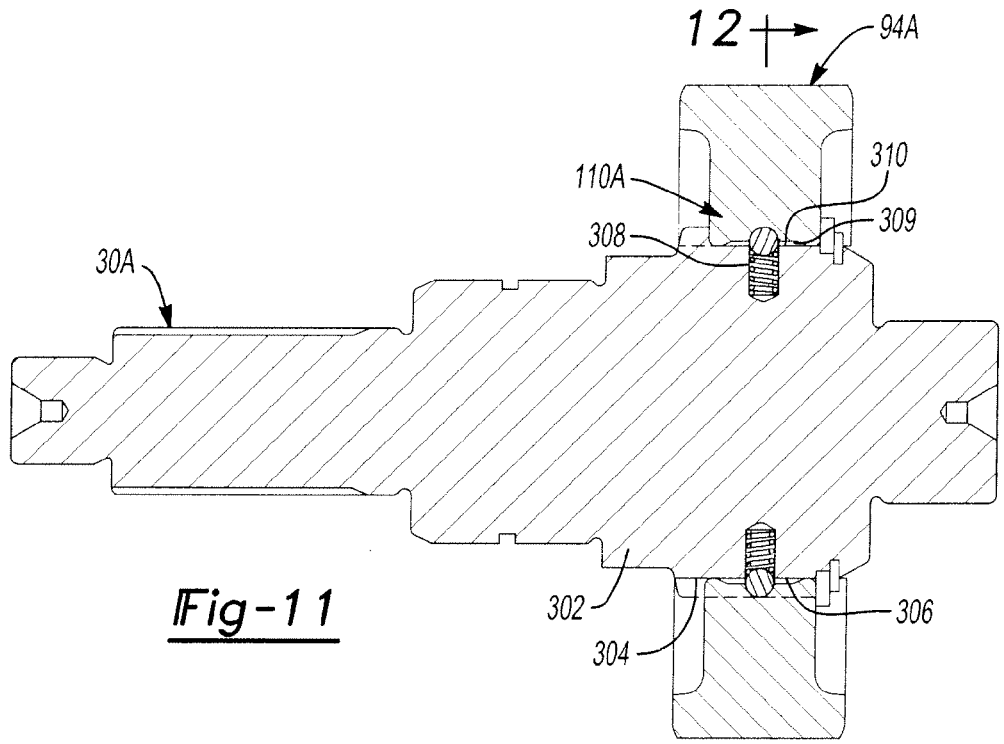
FIG. 11 is a longitudinal sectional view taken generally through a front output shaft assembly associated with the power transfer device of FIG. 10.
Figure 12:
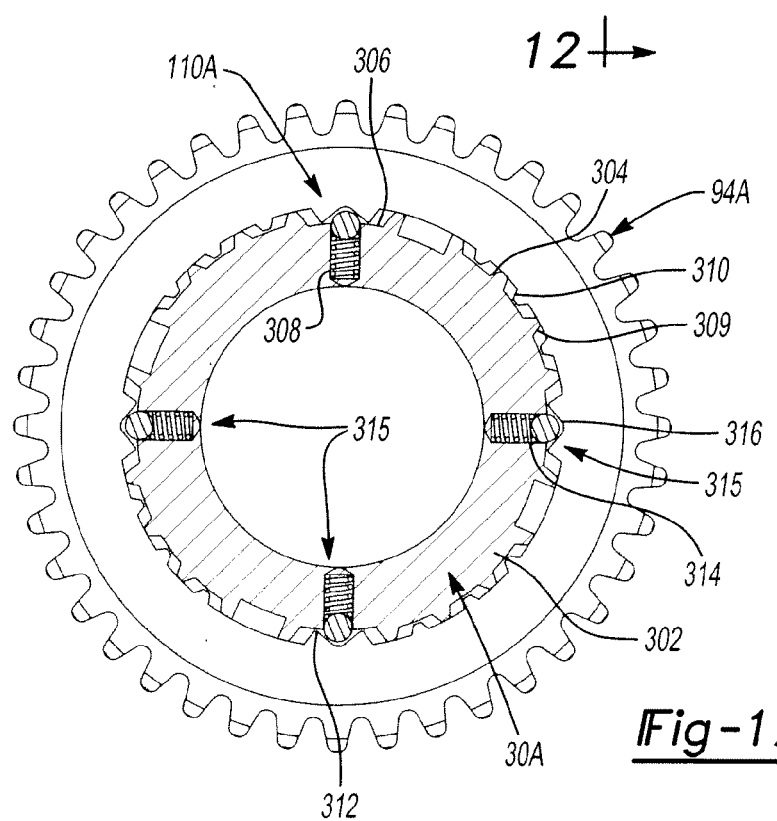
FIG. 12 is a sectional view taken generally along line 12-12 of FIG. 11.

FIG. 10 diagrammatically includes a box 300 illustrating the operative location of LEGO 110A between second sprocket 94A and front output shaft 30A. Referring to FIGS. 11 and 12, a first embodiment of LEGO 110A is shown to include a raised cylindrical sprocket hub portion 302 formed on front output shaft 30A having longitudinally-extending external spline teeth 304 formed thereon. A plurality of recesses 306 are formed between certain pairs of sprocket hub spline teeth 304. Each recess 306 is generally formed by removing or eliminating one or more external spline teeth 304 to provide a plurality of non-toothed sections on hub 302. A radial bore or pocket 308 is centrally formed in each of recesses 306 to define a plurality of retention chambers. In the exemplary embodiment shown in FIG. 12, a plurality of four equally spaced non-splined recesses 306 and radial bores 308 are formed in sprocket hub portion 302 of front output shaft 30A.

Second sprocket 94A is shown to include a central aperture 309 having longitudinally-extending internal spline teeth 310 formed therein. Internal spline teeth 310 are sized and configured to be interdigitated with external spline teeth 304 on sprocket hub portion 302 of first output shaft 30A. A plurality of "ramped" cam seats 312 are formed between certain pairs of internal spline teeth 310. Based on the exemplary embodiment shown in FIGS. 11 and 12, a plurality of four equally-spaced cam seats 312 are formed in central aperture 309 of drive sprocket 94A and are adapted, upon installation, to be aligned with recesses 306 and retention bores 308 formed in sprocket hub portion 302 of front output shaft 30A. As seen, a spring-biased cam centering device 315 having a spring 314 and a ball follower 316 is at least partially retained within each one of retention bores 308, with each ball 316 being biased by its spring 314 into engagement with a central detent portion of a corresponding on of ramped cam seats 312.

In the position best shown in FIG. 12, each spline tooth 310 of front sprocket 94A is centrally disposed between and disengaged from adjacent spline teeth 304 of front output shaft 30A when balls 316 are centered and biased into engagement with the detent portion of cam seats 312. This central alignment is configured to establish a drive connection and a backlash interface that is bi-directional limited to about four degrees of permissible relative rotation between sprocket 94A and front output shaft 30A. When a relative torque of sufficient magnitude is applied between second sprocket 94A and front output shaft 30A, one of a pair of ramped cam surfaces 320 associated with each cam seat 312 (on opposite sides of the central detent) urges balls 316 to move radically inwardly and allow the limited amount of relative rotation therebetween until driving engagement is established via the positive (i.e. direct) engagement of interdigitated internal sprocket spline teeth 310 and external hub spline teeth 304. This ball-spring arrangement of cam centering devices 315, in combination with the ramp angles of the cam surfaces 320, provides a centering force to assist in establishing a driving connection between second sprocket 94A and front output shaft 30A while introducing a predetermined amount of backlash into the mode shift system of transfer case 20A that is configured to facilitate smooth engagement of mode sleeve 100A with clutch gear 98A. The arrangement disclosed in association with FIGS. 11 and 12 is adaptable with otherwise conventional mode shift systems and permits incorporation of the additional interface within the torque path between the front and rear output shafts. It should also be appreciated that low shift effort operator 110 of FIG. 4 and low shift effort operator 110A of FIGS. 11, 12 can be combined into a transfer case mode shift system if their combined attributes are desired.

Figure 13:
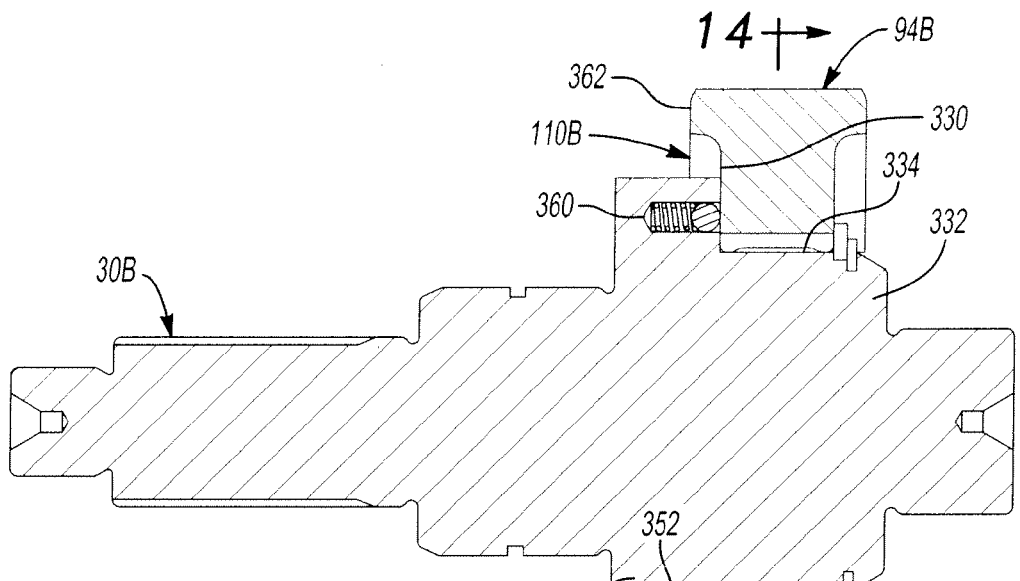
FIG. 13 is a longitudinal sectional view taken generally through an optional front output shaft assembly associated with the power transfer device of FIG. 10.
Figure 14:
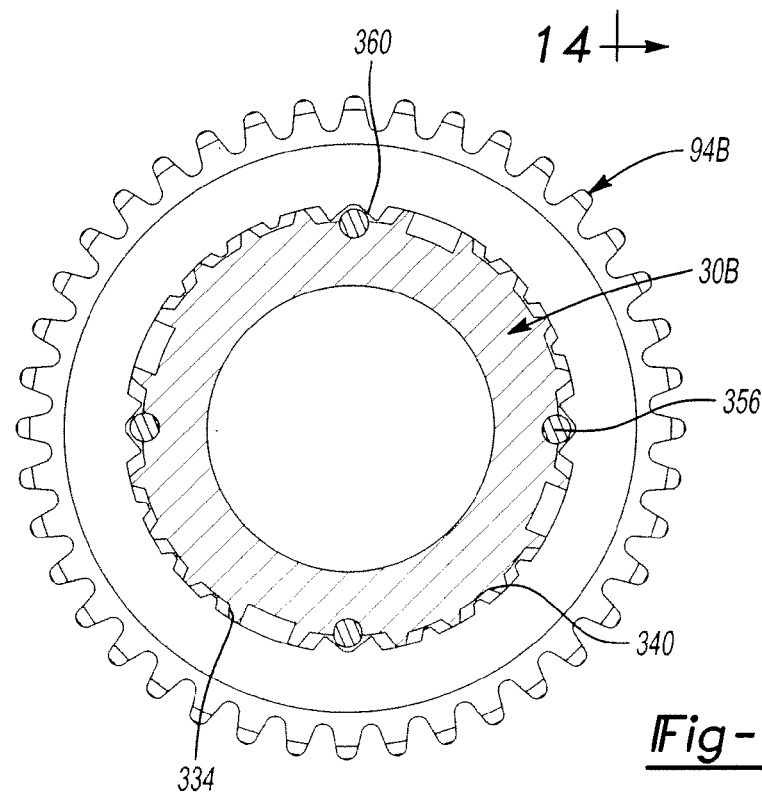
FIG. 14 is a sectional view taken generally along line 14-14 of FIG. 13.

Referring now to FIGS. 13 and 14, an alternative LEGO 110B is shown again in association with an interface between a second sprocket 94B and a front output shaft 30B. However, in this instance, a coaxial or face cam arrangement 330 is used in place of the radial camming arrangement shown in FIGS. 11 and 12. Front output shaft 30B is shown to include a cylindrical sprocket hub portion 332 having longitudinally-extending external spline teeth 334 that are meshed with internal spline teeth 340 formed on second sprocket 94B. As before, a predetermined amount of spline clearance between adjacent interdigitated spline teeth for controlled backlash is provided when shaft external splines 334 are centered relative to sprocket internal splines 340. In this configuration, LEGO 110B is configured as a spring-biased face cam arrangement 350 having a plurality of spring-biased cam centering devices, shown as sets of a spring 354 and a ball 356, that are disposed in circumferentially aligned bores 352 formed in a radial ring portion 358 of front output shaft 30B. Each balls 356 is biased by a spring 354 to engage and be centrally seated in a detent portion of a corresponding one of a plurality of ramped cam section of a corresponding one of a plurality of ramped cam seats 360 formed in a radial face surface 362 of second sprocket 94B. Each ramped cam seat 360 includes a pair of face cam surfaces having a predefined ramp angle selected to permit limited rotatable indexing of second sprocket 94B relative to front output shaft 30B. As will be appreciated, the spring-biased face cam arrangement 350 could be reversed with retention bores 352 formed in face surface 362 of sprocket 94B and with ramped cam seats 360 formed in a face surface of ring portion 358 on front output shaft 30B. A plurality of four equally spaced sets of springs and balls are aligned with four equally spaced ball seats to provide the exemplary face cam arrangement shown.

As noted, transfer case 20A of FIG. 10 illustrates the optional positioning of locating the additional interface (LEGO 110A, 110B) between the front output shaft and its sprocket. Thus, the clutch teeth removed from the clutch gear-mode sleeve interface of FIGS. 1 through 9 can be added back in order to reduce the backlash in the mainshaft. However, under any scenario disclosed, a spring-biased cam arrangement is added in combination with a predetermined amount of interface backlash between two coupled components to facilitate improved mode shift functionality and quality. One performance benefit is that a lower torque motor is required with the actuator assembly for the purpose of indexing and aligning the shift components. Another performance benefit resides in utilization of the available space around the front output shaft-sprocket interface to improve overall packaging.

In summary, the present disclosure is adapted for use with shift systems using slideable clutch collars or sleeves to address and limit "blocked" tooth engagement conditions between the clutch sleeve and a clutch member such as a clutch gear. Specifically, the present disclosure introduces an additional interface into the mode shift system configured to allow a limited, but predetermined, amount of bi-directional backlash between the clutched components to reduce the effort (i.e. application force) required to establish a fully engaged connection between the clutch sleeve and the clutch gear. The low effort shift operator of the present disclosure provides this additional interface and functions to decrease the tangential load required to circumferentially index the clutch gear from a blocked position into an unblocked position relative to the clutch sleeve. While this additional interface is shown provided by a cam mechanism disposed between the clutch gear and the drive sprocket, those skilled in the art will appreciate that location of the low effort shift operator can be varied within the mode shift system. The cam mechanism is spring loaded to provide a centering function between the components of the low effort shift operator to center the backlash so as to allow indexing in both directions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power transfer mechanism for a four-wheel drive vehicle having a powertrain, a first driveline for driving a pair of first wheels and a second driveline for driving a pair of second wheels, the power transfer mechanism comprising:

a first shaft adapted to transmit drive torque from the powertrain to the first driveline;

a second shaft adapted to be coupled to the second driveline;

a transfer mechanism including a first transfer component rotatably mounted on the first shaft, a second transfer component mounted on the second shaft, and a torque transmission component interconnecting the first and second transfer components;

a mode clutch for selectively coupling the first transfer component for driven rotation with the first shaft, the mode clutch including a clutch gear fixed to the first transfer component and having clutch gear teeth, and a mode sleeve fixed via a sliding spline connection for rotation with the first shaft and having mode sleeve teeth, wherein the mode sleeve is operable in a released position to disengage the mode sleeve teeth from the clutch gear teeth for releasing the transfer mechanism from driven connection with the first shaft, and wherein the mode sleeve is operable in an engaged position to engage the mode sleeve teeth with the clutch gear teeth for coupling the transfer mechanism for driven connection with the first shaft; and a backlash interface connection disposed between the second transfer component and the second shaft to permit a predetermined amount of angular movement therebetween so as to reduce an axial force required to move the mode sleeve from the released position into the engaged position, the backlash interface connection including external shaft spline teeth formed on the second shaft, a plurality of recesses formed between certain adjacent pairs of the external shaft spline teeth with a retention chamber formed in each recess, internal spline teeth formed in a central aperture of the second transfer component and which are interdigitated with the external shaft spline teeth, a plurality of ramped cam seats formed between adjacent pairs of the internal spline teeth and which are aligned with respect to the plurality of recesses, and a plurality of spring-biased cam followers at least partially disposed in each of the retention chambers and biased into engagement with a corresponding one of the ramped cam seats so as to establish a predefined amount of angular clearance between each set of interdigitated shaft spline teeth and internal spline teeth to define a predetermined amount of backlash between the second transfer component and the second shaft;

wherein the second transfer component is rotatable through the backlash to align the clutch gear teeth with the mode sleeve teeth to circumvent a blocked movement of the mode sleeve from the released position into the engaged position.

2. The power transfer mechanism of claim 1, wherein the predetermined amount of backlash defines about eight degrees of relative rotation between the second transfer component and the second shaft.

3. The power transfer mechanism of claim 1, wherein the internal spline teeth on the second transfer component are centered relative to the shaft spline teeth when the followers are centrally-disposed within the ramped cam seats.

4. The power transfer mechanism of claim 1 wherein the first transfer component is a first sprocket, the second transfer component is a second sprocket, and the torque transmission component is a belt or chain interconnecting the first sprocket for rotation with the second sprocket.

5. The power transfer mechanism of claim 4 wherein the spring-biased cam followers include a spring and a ball at least partially retained in each of the recesses, and wherein each ball is biased by the spring into engagement with a central portion of a corresponding one of the ramped cam seats to centrally locate and align the internal spline teeth of the second sprocket relative to the external shaft teeth on the second shaft.

6. The power transfer mechanism of claim 5 wherein each of the ramped cam seats includes a pair of cam surfaces configured to displace the balls inwardly against the biasing force of the springs in response to rotational movement of the second sprocket relative to the second shaft in response to translational movement of the mode sleeve from the released position toward the engaged position.

7. The power transfer mechanism of claim 1 wherein the mode clutch assembly further includes a synchronizer that is operably disposed between the mode sleeve and the clutch gear.

8. The power transfer mechanism of claim 1 further comprising a power-operated actuator operable for moving the mode sleeve between the released and engaged positions, a mode select mechanism for permitting a vehicle operator to select between a two-wheel drive mode established when the mode sleeve is in the released position and a four-wheel drive mode established when the mode sleeve is in the engaged position, and a controller for receiving a mode signal from the mode select mechanism indicative of the selected drive mode and controlling operation of the power-operated actuator in response to the mode signal.

9. A power transfer mechanism for a four-wheel drive vehicle having a powertrain, a first driveline for driving a pair of first wheels and a second driveline for driving a pair of second wheels, comprising:
 a first shaft adapted to transmit drive torque from the powertrain to the first driveline;
 a second shaft adapted to be coupled to the second driveline;
 a transfer mechanism including a first sprocket rotatably supported on the first shaft, a second sprocket mounted on the second shaft, and an endless chain or belt interconnecting the first and second sprockets;
 a mode clutch for selectively coupling the first sprocket to the first shaft and including a clutch gear coupled to the first sprocket and having clutch gear teeth, and a mode sleeve coupled for rotation with the first shaft and axially moveable relative to the clutch gear between first and second positions and having mode sleeve teeth, wherein the mode sleeve is operable in the first position to disengage the mode sleeve teeth from engagement with the clutch gear teeth and is operable in the second position to engage the mode sleeve teeth with the clutch gear teeth; and
 a backlash interface connection disposed between the second sprocket and the second shaft to permit a predetermined amount of relative angular travel therebetween so as to reduce an axial force required to move the mode sleeve from the first position to the second position, the backlash interface connection including internal sprocket spline teeth formed on the second sprocket that are interdigitated with external spline teeth formed on the second shaft and defining a centered position with a predefined clearance between the interdigitated spline teeth, a plurality of circumferentially-aligned retention chambers formed in a face surface on one of the second sprocket and the second shaft, a plurality of circumferentially-aligned cam seats formed in a face surface on the other one of the second sprocket and the second shaft, and spring-biased cam followers partially disposed in the retention chambers and centrally positioned in engagement with the cam seats when the interdigitated spline teeth are centrally positioned;
 wherein the second sprocket is rotatable through the predetermined backlash to assist in aligning the clutch gear teeth with the mode sleeve teeth to circumvent a blocked movement of the mode sleeve from the first position to the second position.

10. The power transfer mechanism of claim 9 wherein the internal mode sleeve teeth engage the external clutch gear teeth to overcome the spring bias and rotate the clutch gear relative to the clutch hub.

11. The power transfer mechanism of claim 9 wherein the predetermined amount of backlash is about eight degrees of relative rotation between the second sprocket and the second shaft.

12. The power transfer mechanism of claim 9 wherein the internal sprocket spline teeth are centered relative to the external shaft spline teeth when the cam followers are centrally disposed within the cam seats.

13. The power transfer mechanism of claim 12 wherein the spring-biased cam followers include a spring and a ball at least partially retained in each of the recesses, and wherein each ball is biased by the spring into engagement with a central portion of a corresponding one of the ramped cam seats to centrally locate and align the internal spline teeth of the second sprocket relative to the external shaft teeth on the second shaft.

14. The power transfer mechanism of claim 13 wherein each of the cam seats includes a pair of cam surfaces configured to displace the balls inwardly against the biasing force of the springs in response to rotational movement of the second sprocket relative to the second shaft caused by translational movement of the mode sleeve from the released position into the engaged position.

15. The power transfer mechanism of claim 9 wherein the mode clutch assembly further includes a synchronizer that is operably disposed between the mode sleeve and the clutch gear.

16. The power transfer mechanism of claim 9 further comprising a power-operated actuator operable for moving the mode sleeve between the released and engaged positions, a mode select mechanism for permitting a vehicle operator to select between a two-wheel drive mode established when the mode sleeve is in the released position and a four-wheel drive mode established when the mode sleeve is in the engaged position, and a controller for receiving a mode signal from the mode select mechanism indicative of the selected drive mode and controlling operation of the power-operated actuator in response to the mode signal.

17. A power transfer mechanism for a four-wheel drive vehicle having a powertrain and first and second drivelines, the power transfer mechanism comprising:
 a first shaft adapted to transmit drive torque from the powertrain to the first driveline;
 a second shaft adapted to be drivingly coupled to the second driveline;
 a transfer mechanism including a first transfer component rotatably mounted on the first shaft, a second transfer component coupled via a backlash interface connection to the second shaft, and a torque transmission component interconnecting the first transfer component to the second transfer component; and
 a mode clutch for selectively coupling the first transfer component for driven rotation with the first shaft, the mode clutch including a mode sleeve moveable between first and second mode positions, wherein the mode sleeve is operable in the first mode position to disconnect the first transfer component from driven connection with the first shaft, and wherein the mode sleeve is operable in the second mode position to drivingly couple the first transfer component for rotation with the first shaft;
 wherein the backlash interface connection is operable to permit a predetermined amount of relative angular travel between the second transfer component and the second shaft so as to reduce a force required to move the mode sleeve from the first mode position into the second mode position, the backlash interface connection including external splines on the second shaft interdigitated with internal splines on the second transfer component such that each set of interdigitated spline teeth define a predetermined amount of backlash between the second transfer component and the second shaft, a plurality of recesses formed in one of the second transfer component and the second shaft, a plurality of cam seats formed in the other one of the second transfer component and the second shaft, and a plurality of spring-biased cam followers retained in the recesses and engaging a corresponding one of the cam seats when the interdigitated spline teeth are centrally positioned, wherein the predetermined backlash is provided to circumvent a blocked movement of the mode sleeve from the first mode position into the second mode position.

18. The power transfer mechanism of claim 17 wherein the cam seats define a pair of ramped cam surfaces, and wherein the internal splines on the second transfer component are centered relative to the external spline teeth on the second shaft when the followers are centrally disposed between the ramped cam surfaces.

19. The power transfer mechanism of claim 17 wherein the recesses are circumferentially aligned and formed in a face surface of the one of the second transfer component and the second shaft, wherein the cam seats are circumferentially aligned and formed in a face surface of the other one of the second transfer component and the second shaft, wherein the mode sleeve has clutch teeth engageable with clutch teeth formed on the first transfer component, and wherein the second transfer component is rotatable relative to the second shaft via the backlash interface connection to assist in aligning the clutch teeth of the first transfer component with the mode sleeve clutch teeth upon movement of the mode sleeve into the second mode position.

20. The power transfer mechanism of claim 17 wherein the recesses extend radially from the second shaft, wherein the cam seats extend radially from the second transfer component and are aligned with the recesses, wherein the spring-biased cam followers are at least partially retained in the recesses and are biased outwardly into engagement with the cam seats, wherein the mode sleeve includes mode sleeve teeth configured to be selectably engageable with clutch teeth formed on the first transfer component, and wherein the second transfer component is rotatable relative to the second shaft via the backlash interface connection to assist in aligning the clutch teeth with the mode sleeve teeth upon movement of the mode sleeve into the second mode position.

* * * * *